(12) United States Patent
Adar et al.

(10) Patent No.: US 8,601,193 B2
(45) Date of Patent: Dec. 3, 2013

(54) PERFORMANCE MONITOR DESIGN FOR INSTRUCTION PROFILING USING SHARED COUNTERS

(75) Inventors: Etai Adar, Yokneam Ilit (IL);
Srinivasan Ramani, Cary, NC (US);
Eric F. Robinson, Raleigh, NC (US);
Thuong Q. Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 12/900,667

(22) Filed: Oct. 8, 2010

(65) Prior Publication Data

US 2012/0089984 A1    Apr. 12, 2012

(51) Int. Cl.
*G06F 13/24*    (2006.01)
(52) U.S. Cl.
USPC .......................... 710/260; 710/240; 710/200
(58) Field of Classification Search
USPC .................. 710/260–269, 200, 240–244
See application file for complete search history.

(56) References Cited

U.S. PATENT DOCUMENTS

| | | | |
|---|---|---|---|
| 6,574,727 B1 | 6/2003 | Davidson et al. | |
| 6,748,522 B1 | 6/2004 | Gregoire et al. | |
| 7,200,522 B2 | 4/2007 | Mericas | |
| 7,433,803 B2 | 10/2008 | Circello et al. | |
| 7,461,383 B2 | 12/2008 | Gara et al. | |
| 7,548,832 B2 | 6/2009 | Mericas | |
| 7,657,890 B2 | 2/2010 | Kanai et al. | |
| 7,676,655 B2 * | 3/2010 | Jordan | 712/214 |
| 7,702,887 B1 * | 4/2010 | Grohoski et al. | 712/227 |
| 7,987,345 B2 | 7/2011 | Silyaev et al. | |

| | | |
|---|---|---|
| 2002/0144003 A1 | 10/2002 | Jin |
| 2004/0168098 A1 | 8/2004 | Matsuoka |
| 2005/0183065 A1 | 8/2005 | Wolczko et al. |
| 2006/0235648 A1 | 10/2006 | Zheltov et al. |
| 2007/0143582 A1 | 6/2007 | Coon et al. |
| 2007/0150867 A1 | 6/2007 | Barsness et al. |
| 2007/0168985 A1 | 7/2007 | Konishi et al. |

(Continued)

FOREIGN PATENT DOCUMENTS

| | | |
|---|---|---|
| CN | 101571843 | 11/2009 |
| DE | 3928303 A1 | 2/1991 |

(Continued)

OTHER PUBLICATIONS

U.S. Appl. No. 12/902,491, filed Oct. 12, 2010, Adar et al.
U.S. Appl. No. 12/900,992, filed Oct. 8, 2010, Adar et al.
Office Action issued on Nov. 30, 2012 for U.S. Appl. No. 12/902,491, 17 pages.

(Continued)

*Primary Examiner* — Tim T Vo
*Assistant Examiner* — Kim Huynh
(74) *Attorney, Agent, or Firm* — Yee & Associates, P.C.; Daniel H. Schnurmann

(57) ABSTRACT

Counter registers are shared among multiple threads executing on multiple processor cores. An event within the processor core is selected. A multiplexer in front of each of a number of counters is configured to route the event to a counter. A number of counters are assigned for the event to each of a plurality of threads running for a plurality of applications on a plurality of processor cores, wherein each of the counters includes a thread identifier in the interrupt thread identification field and a processor identifier in the processor identification field. The number of counters is configured to have a number of interrupt thread identification fields and a number of processor identification fields to identify a thread that will receive a number of interrupts.

19 Claims, 11 Drawing Sheets

(56) References Cited

U.S. PATENT DOCUMENTS

| | | |
|---|---|---|
| 2008/0195851 A1 | 8/2008 | Hoogerbrugge |
| 2008/0294881 A1 | 11/2008 | Chen et al. |
| 2009/0089014 A1 | 4/2009 | Silyaev et al. |
| 2010/0042997 A1 | 2/2010 | Lev |
| 2010/0095300 A1 | 4/2010 | West et al. |
| 2010/0158005 A1 | 6/2010 | Mukhopadhyay et al. |

FOREIGN PATENT DOCUMENTS

| | | |
|---|---|---|
| EP | 750255 A2 | 12/1996 |
| EP | 0969379 A2 | 1/2000 |
| EP | 1321856 A2 | 6/2003 |
| WO | 2006079940 | 3/2006 |

OTHER PUBLICATIONS

Treibig et al., "LIKWID: A lightweight performance-oriented tool suite for x86 multicore environments", 2010, Accepted for PSTI2010, the First International Workshop on Parallel Software Tools and Tool Infrastructures, San Diego CA, Sep. 13, 2010. arXiv:1004.4431, pp. 1-7.

Maxwell et al., "Accuracy of performance monitoring hardware", Proc. LACSI Symposium, Santa Fe NM, 2002, pp. 1-21.

Moore et al., "Thread Level Transactional Memory", Mar 31, 2005, Technical Report 1524, Computer Sciences Dept., UW-Madison, pp. 1-11.

USPTO Non-Final Office Action, U.S. Appl. No. 12/900,992, Mar. 22, 2013, 7 pages.

* cited by examiner

US 8,601,193 B2

PERFORMANCE MONITOR DESIGN FOR INSTRUCTION PROFILING USING SHARED COUNTERS

BACKGROUND

1. Field

The disclosure relates generally to data processing, and more specifically, to counters in multithreaded processors.

2. Description of Related Art

Chips may contain multiple processors and multiple processor cores on which applications run multiple threads. The processor cores may have built-in performance instrumentation that monitors various performance-related events occurring during operation of the chip. Performance instrumentation may consist of performance monitor units that provide counters and support for selecting and routing event signals to those counters. Performance monitor units may also interrupt one or more processors in response to a condition being met. For example, interruption of a thread on a processor may be necessary in response to a counter overflow to support instruction sampling. An interrupt signal to the processor core may be used to freeze a register that holds the address of an instruction that is executing at the time the condition occurred, or that has recently completed execution.

BRIEF SUMMARY

Counter registers are shared among multiple threads executing on multiple processor cores. An event is selected within the processor core. A multiplexer in front of each of a number of counters is configured to route the event to a counter. A number of counters are assigned for the event to each of a plurality of threads running for a plurality of applications on a plurality of processor cores, wherein each of the counters includes a thread identifier in the interrupt thread identification field and a processor identifier in the processor identification field. The number of counters is configured to have a number of interrupt thread identification fields and a number of processor identification fields to identify a thread that will receive a number of interrupts.

DETAILED DESCRIPTION

Figure 1:
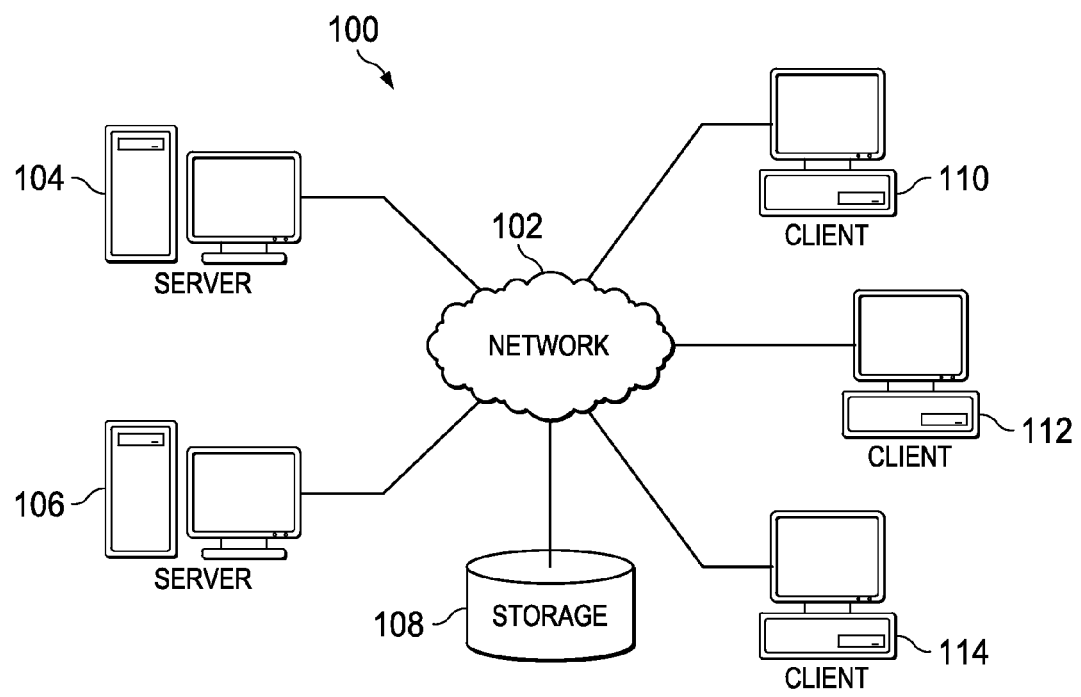
FIG. 1 is an illustrative diagram of a data processing environment in which illustrative embodiments may be implemented.

The illustrative embodiments recognize and take into account that system software may dynamically assign individual counters to hardware threads via special fields in the counter registers.

The illustrative embodiments provide that counters assigned to a particular thread may be frozen while leaving counters assigned to other threads running. The illustrative examples provide that special fields in the counter registers may identify the thread and processor core that each counter is assigned to also allow selection of all counters that belong to the thread for freezing. A mechanism is also provided to send an interrupt signal to the thread or processor core whose counter meets a trigger condition, such as an overflow.

The illustrative embodiments recognize and take into account that a counter assigned to a particular thread may be frozen, while leaving counters assigned to other threads active. Similarly, a frozen counter belonging to a particular thread and processor core can be unfrozen by software, such as the interrupt handler, without affecting counters belonging to other threads and processor cores. The shared counters may be within a processor core, in which case all threads in the processor core could be sharing the counters. Counters that are outside processor cores may be shared among multiple processor cores. Counters outside any processor core may be accessible via memory-mapped input/output (MMIO).

The illustrative embodiments recognize and take into account that in a chip with multiple processor cores, each processor core may belong to a different partition. Security breaches may arise if the shared counters are outside the processor cores and are accessible by many processor cores. In such cases, the suggested embodiment of this invention is to split up the shared pool of counters into groups of counters, and to assign each group of counters to a separate page in the system memory map. By setting access control attributes in the memory management units inside each processor core appropriately, processor cores can be restricted to accessing only counter groups that belong to the same partition as them. In order to prevent event bus signals from being visible at counters belonging to a different partition, control fields are provided in a hypervisor-accessible register to zero out all signals that cross over from one partition to another.

The illustrative examples recognize and take into account that, since counters are dynamically assigned to hardware threads by system software, saving and restoring of counter values can be avoided in responding to a migration of a software thread to a different hardware thread. The new hardware thread's events may be routed to the same counters as before. A counter may be reassigned to the new hardware thread that will receive interrupts, so that interrupts may be routed correctly to the new hardware thread that will be handling interrupt conditions at the counter.

The illustrative examples provide a method of dividing a shared number of counters into counter groups, and assigning each counter group to a separate page in the system memory map.

Referring to FIG. 1, a pictorial representation of a network of data processing systems is depicted in which illustrative embodiments may be implemented. Network data processing system 100 may be a network of computers in which the illustrative embodiments may be implemented. Network data processing system 100 contains network 102, which may be the medium used to provide communication links between various devices and computers operably coupled together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as an intranet, a local area network (LAN), or a wide area network (WAN). FIG. 1 is intended as an example, and not as an architectural limitation for the different illustrative embodiments.

Figure 2:
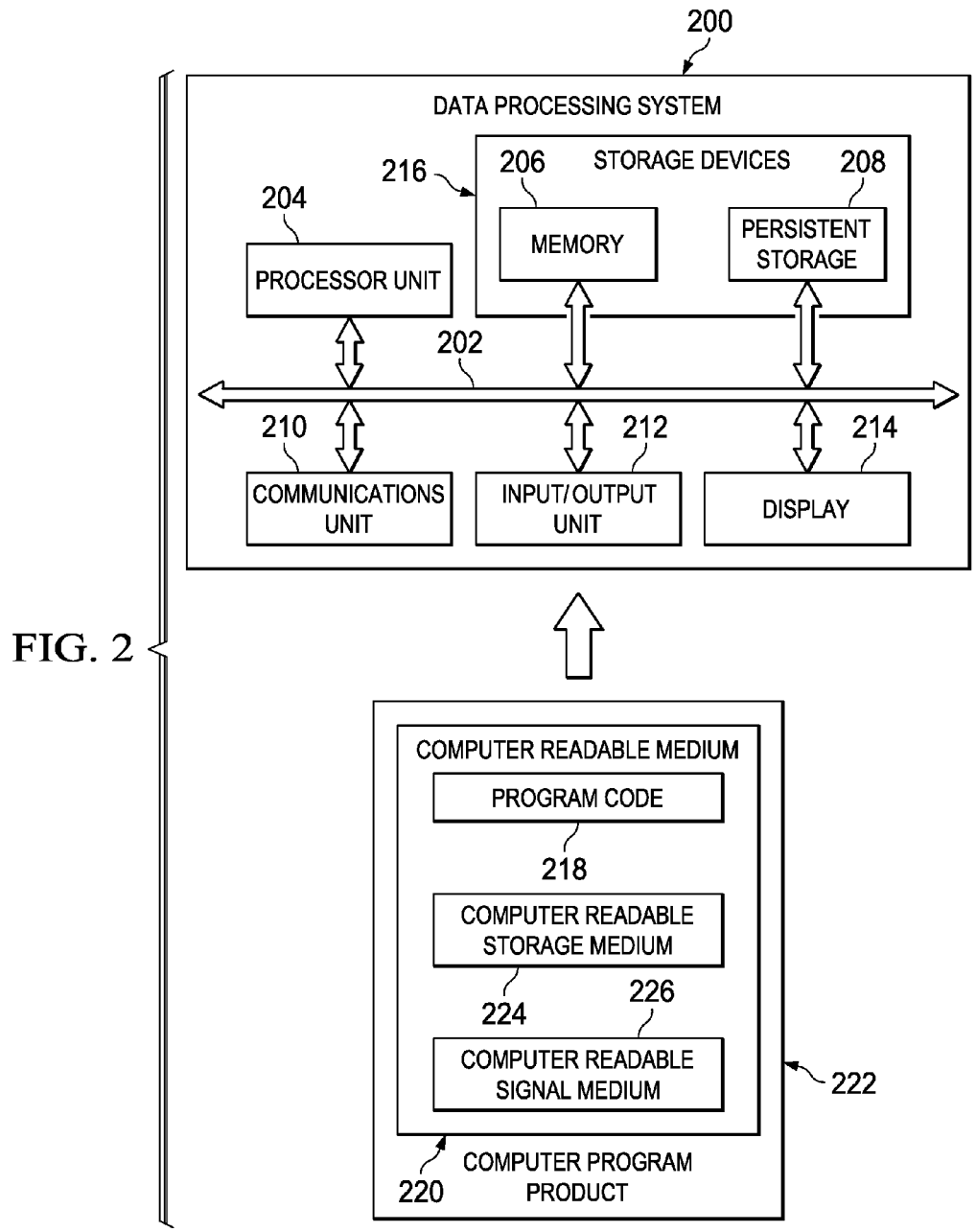
FIG. 2 is an illustration of a data processing system depicted in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to run instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor may be present with secondary processors on a single chip. As another illustrative example, processor unit 204 may be a symmetric multi-processor system containing multiple processors of the same type.

Memory 206 and persistent storage 208 are examples of storage devices 216. A storage device may be any piece of hardware that may be capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device, with power management features like support for various lower power states. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The medium used by persistent storage 208 also may be removable. For example, a removable hard drive may be used for persistent storage 208.

Communications unit 210, in these examples, provides for communications with other data processing systems or devices. In these examples, communications unit 210 may be a network interface card. Communications unit 210 may provide communications through the use of either or both physical and wireless communications links.

Input/output unit 212 allows for input and output of data with other devices that may be operably coupled to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be in a memory, such as memory 206.

These instructions are referred to as program code, computer usable program code, or computer readable program code that may be read and run by a processor in processor unit 204. The program code in the different embodiments may be embodied on different physical or computer readable storage mediums, such as memory 206 or persistent storage 208.

Program code 218 may be in a functional form on computer readable medium 220 that may be selectively removable and may be loaded onto or transferred to data processing system 200 for running by processor unit 204. Program code 218 and computer readable medium 220 form computer program product 222 in these examples. In one example, computer readable medium 220 may be computer readable storage medium 224 or computer readable signal medium 226. Computer readable storage medium 224 may include, for example, an optical or magnetic disk that may be inserted or placed into a drive or other device that may be part of persistent storage 208 for transfer onto a storage device, such as a hard drive, that may be part of persistent storage 208. Computer readable storage medium 224 also may take the form of a persistent storage, such as a hard drive, a thumb drive, or a flash memory, that may be operably coupled to data processing system 200. In some instances, computer readable storage medium 224 may not be removable from data processing system 200. medium Alternatively, program code 218 may be transferred to data processing system 200 using computer readable signal medium 226. Computer readable signal medium 226 may be, for example, a propagated data signal containing program code 218. For example, computer readable signal medium 226 may be an electromagnetic signal, an optical signal, and/or any other suitable type of signal. These signals may be transmitted over communications links, such as wireless communication links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal medium 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 may be any hardware apparatus that may store data. Memory 206, persistent storage 208, and computer readable medium 220 are examples of storage devices in a tangible form. In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
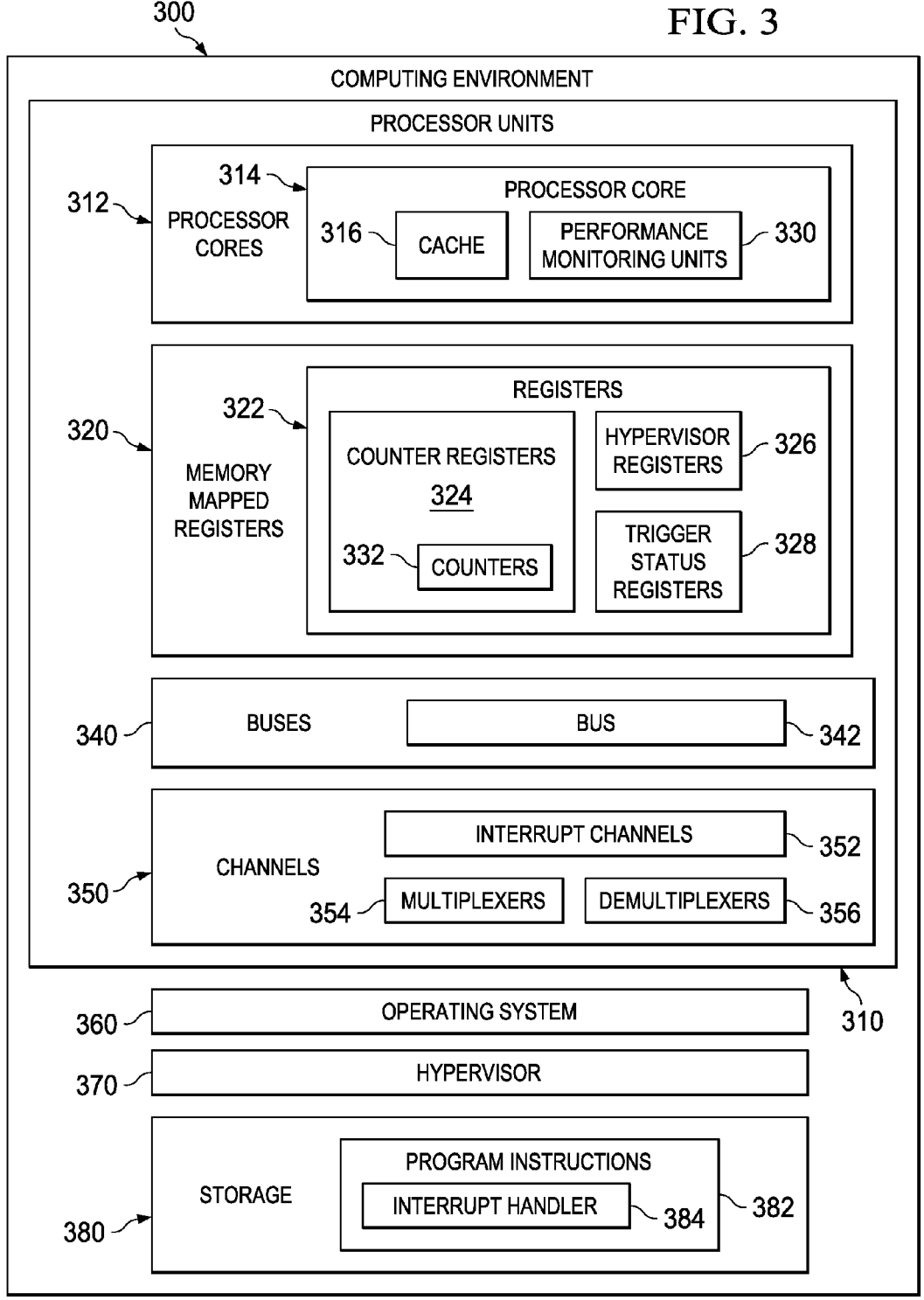
FIG. 3 is a computing system environment in which the illustrative embodiments may be implemented.

Turning to FIG. 3, a computing system environment in which the illustrative embodiments may be implemented is depicted. Computing environment 300 comprises processor units 310, operating system 360, hypervisor 370, and storage 380. Processor units 310 comprise processor cores 312, memory mapped registers 320, buses 340, and channels 350. Processor cores 312 comprise a number of processor cores, such as processor core 314. Processor core 314 may further comprise cache 316 and performance monitoring unit. Memory mapped registers 320 may comprise counter registers 324, hypervisor registers 326, and trigger status registers 328. Counter registers 324 may comprise a number of counters in counters 332.

Figure 4:
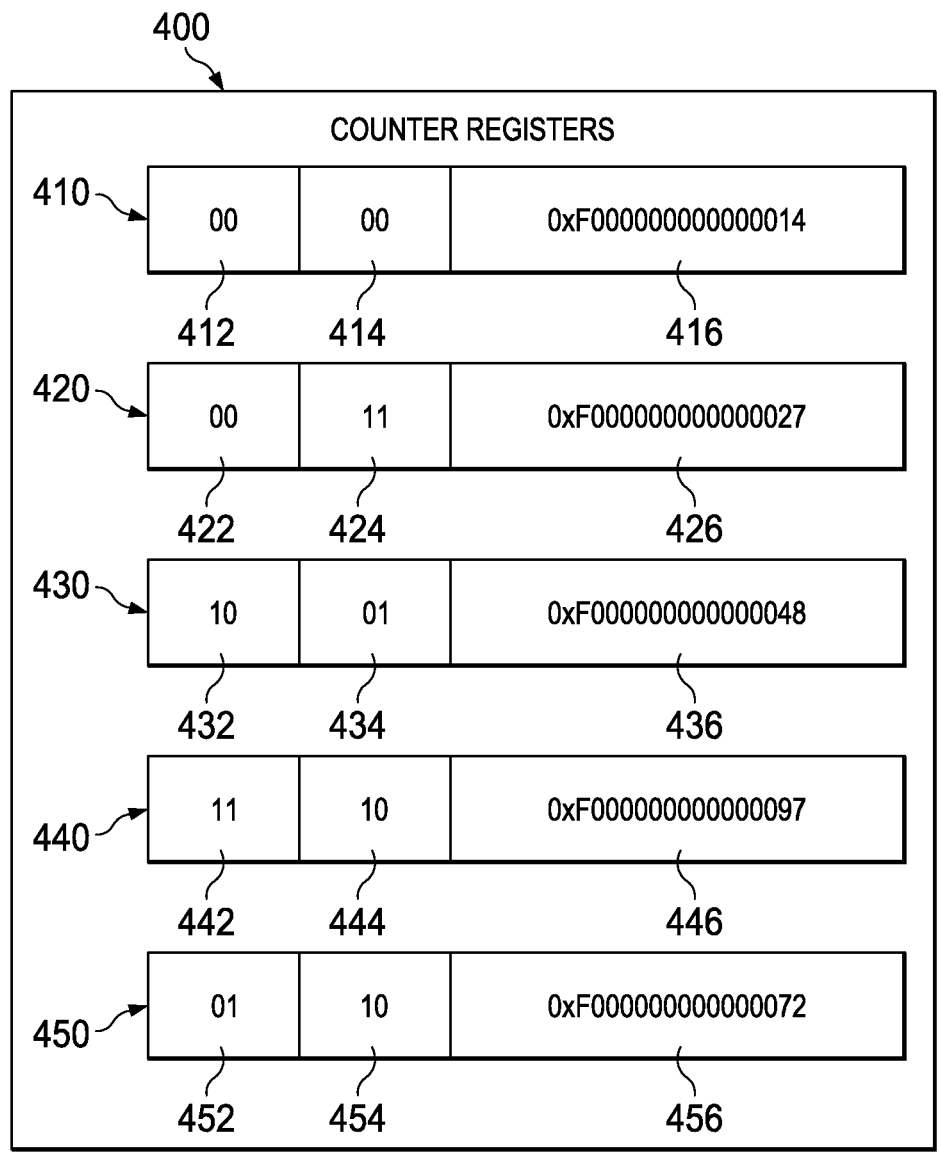
FIG. 4 is an illustration of a counter in accordance with an illustrative embodiment.

The illustrative embodiments recognize and take into account that at least one counter register is necessary for each thread that may be monitored simultaneously while running on processor cores 312. As used herein and in the drawings "p" shall refer to a number of processor cores. As used herein "n" shall refer to a number of threads running on one or more processor cores. The illustrative embodiments recognize and take into account that in processor units with multiple trigger status registers, the trigger status register may be p*n bits wide. The illustrative embodiments recognize and take into account that counter registers such as counter registers 324 may contain a number of special fields configured to allow system software, such as program instructions 382 in storage 380 or program instructions that are part of the operating system 360 or the hypervisor 370, to dynamically assign individual counter registers to a number of threads running on processor cores 312. Illustrative embodiments of such special fields are shown in FIG. 4. In addition, system software may be contained in program instructions 382 in storage 380 or in instructions that are part of the operating system 360 or the hypervisor 370 for setting up performance events in the processor cores 314, and other components of the processor units 310 to be counted at the counters. The illustrative embodiments recognize and take into account that counter registers such as counter register 324 may be configured to interrupt processor cores 312 of processor units 310 in response to a condition being met. An illustrative example of a condition may be a counter overflow. The illustrative embodiments recognize that an interruption in response to a counter overflow may be necessary to support instruction sampling.

The illustrative embodiments recognize and take into account that performance monitoring units such as performance monitoring units 330 may provide support for selecting and routing event signals to counter registers 324 via buses 340.

The illustrative embodiments recognize and take into account that performance monitoring units such as performance monitoring units 330 may provide an ability to monitor a number of performance-related events that occur during running of a number of threads on processor cores 312.

Buses 340 may comprise a number of buses such as bus 342. Channels 350 may comprise a number of interrupt channels 352 and a number of multiplexers 354 and a number of demultiplexers 356. Multiplexers 354 are configured in front of counter registers for selecting and routing events to the counter registers. Demultiplexers 356 may select a trigger status register bit to set according to the thread identification and the processor identification in the performance counter that caused an interrupt event. Multiplexers such as multiplexers 354 may be configured in front of each of a number of counters such as counters 324 to route an event to the counter.

Counter registers 324 may be configured, upon occurrence of a condition, to set a bit in a trigger status register such as trigger status registers 328. A trigger status register such as trigger status registers 328 may send a signal via a channel such as interrupt channels 352 to a processor core such as processor core 314 or a specific thread on that processor core, and via a multiplexer such as multiplexers 354 to a counter register such as a counter in counter registers 324. Storage 380 may comprise a number of program instructions such as program instructions 382. System software may be contained in instructions 382 in storage 380 or in instructions that are part of operating system 360 or hypervisor 370 for selecting and routing performance event signals to counters and setting up performance counters as well as for other actions. Program instructions 382 may include interrupt handler 384.

Turning to FIG. 4, an illustration of a counter register is depicted in accordance with an illustrative embodiment. As used herein, processor identifications shall refer to processor core identifications. The illustrative embodiments recognize and take into account that the thread identification field and the processor identification field may each be two bits wide, corresponding to four threads in each processor core and four processors in the environment. The counter field of the counter register may be 64 bits wide. Counter registers 400 may be counter register 324 in FIG. 3. Counter registers 400 comprises a number of counters such as first counter 410, second counter 420, third counter 430, fourth counter 440, and fifth counter 450.

In the illustrative example of FIG. 4, first counter 410 comprises first thread identification field 412 that may have a first thread identification value of 00, first processor identification field 414 that may have a first processor identification 2 bit value of 00, and first counter field 416 that may have a first counter 64 bit value of 0xF000000000000014. Second counter 420 may have second thread identification field 422 that may have a second thread identification value of 00, second processor identification field 424 may have a second processor identification value of 11, and second counter field 426 may have a second counter field value of 0xF000000000000027. Third counter 430 may have third thread identification field 432 having a third thread identification value of 10, third process identification field 434 having a third processor identification value of 01, and third counter field 436 having a third counter value of 0xF000000000000048.

Fourth counter 440 may have fourth thread identification field 442 having a fourth thread identification value of 11, fourth processor identification field 444 having a fourth process identification value of 10, and fourth counter field 446 having a fourth counter value of 0xF000000000000097. Fifth counter 450 may have fifth thread identification field 452 having a fifth thread identification value of 01, fifth processor identification field 454 having a fifth processor identification value of 10, and fifth counter field 456 having a fifth counter value of 0xF000000000000072.

Figure 5:
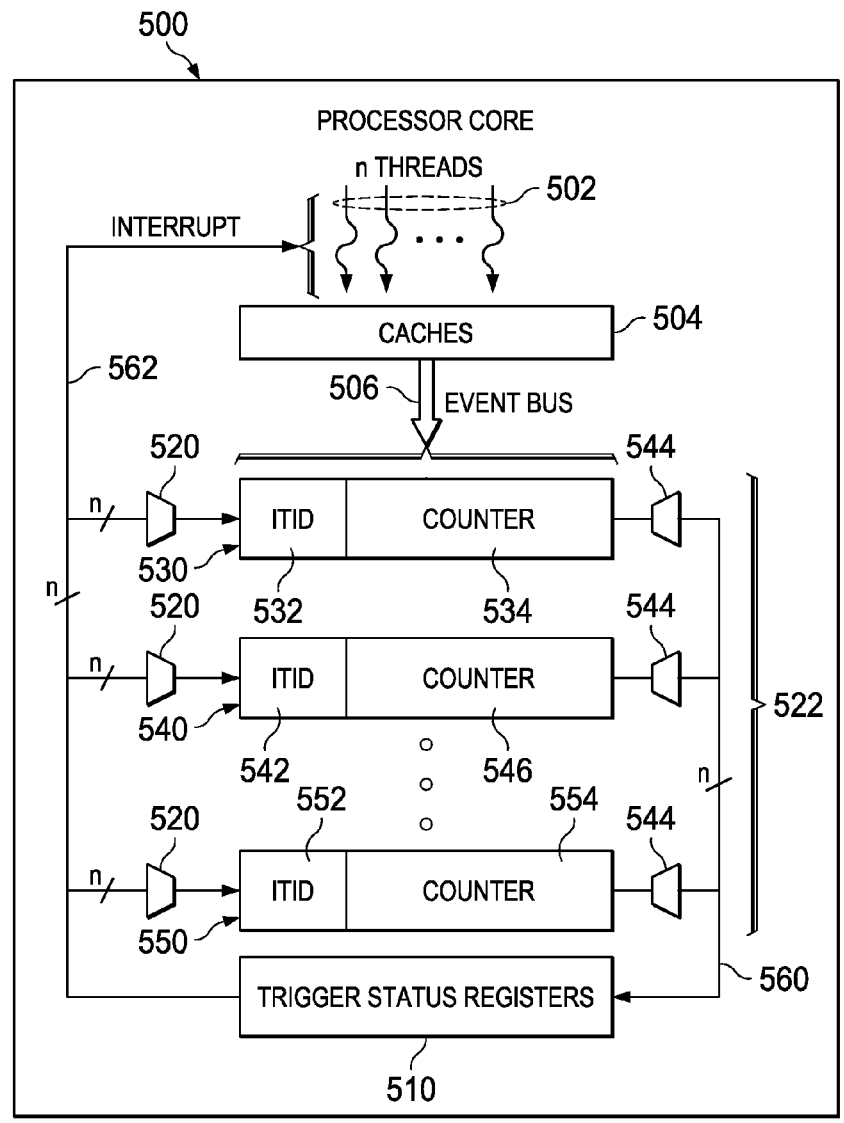
FIG. 5 is an illustration of shared counters in a single processor core in accordance with an illustrative embodiment.

Turning to FIG. 5, an illustration of shared counters in a single processor core in accordance with an illustrative embodiment is disclosed. Processor core 500 may have a number of threads 502, a number of caches 504 and a number of counters 522 and a trigger status registers 510. In response to counters 522 and trigger status registers 510 being implemented inside one or more processor cores such as processor core 500 in FIG. 5, counters 522 and trigger status registers 510 may be implemented as processor core registers rather than memory-mapped registers. The illustrative embodiments recognize and take into account that such processor core registers may be accessible as memory-mapped registers. First counter 530 may comprise first interrupt thread identification value 532 and first counter value 534. Second counter 540 may comprise second interrupt thread identification value 542 and second counter value 546. Third counter 550 may represent a last counter of any number of counters. Third counter 550 may comprise third interrupt thread identification 552 and third counter value 554.

In response to any of the performance counters 522 determining that a trigger condition has been met for a thread such as one of threads 502 running in the processor core, performance counters 522 set a bit for the thread in trigger status register 510 via demultiplexers 544 and channel 560. Trigger status register 510 sends an interrupt signal along channel 562 to one or more threads in threads 502 and freezes each counter corresponding to each of the interrupted threads via multiplexers such as multiplexers 520 operably coupled to channel 562. First counter 530, second counter 540, and third counter 550 receive event signals via bus 506, and interrupt thread identifications from system software, such as program instructions 382 in storage 380 or program instructions that are part of the operating system 360 or the hypervisor 370 in FIG. 3. Bus 506 may be bus 342 in FIG. 3 and channel 562 may be one of interrupt channels 352 in FIG. 3. First counter 530, second counter 540, and third counter 550 may be from counter 324 in FIG. 3.

Figure 6:
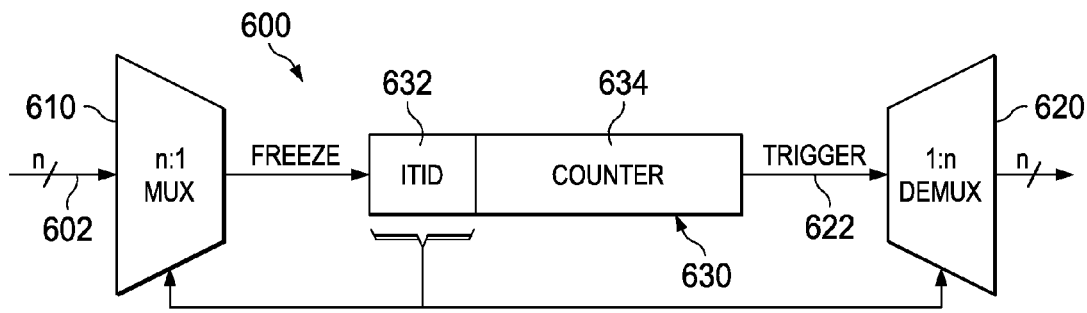
FIG. 6 is an illustration of a frozen counter having a interrupt thread identification in accordance with an illustrative embodiment.

Turning to FIG. 6, an illustration of a frozen counter having an interrupt thread identification in accordance with an illustrative embodiment is disclosed. Signal 602 from an interrupt channel such as interrupt channel 562 in FIG. 5 passes through multiplexer 610 to freeze counter 630 if the bit in the trigger status register that is selected by the multiplexer is set. The selection of a particular signal from signal 602 that is sent to the freeze signal of the counter is determined by the interrupt thread identification value 632 of the counter. Counter 630 receives an interrupt thread identification value 632 from system software, such as program instructions 382 in storage 380 or program instructions that are part of the operating system 360 or the hypervisor 370. Counter values 634 increment in response to the event signals received on event bus such as bus 506 in FIG. 5. In response to counter 630 determining that a trigger condition has been met, counter 630 signals the trigger condition on channel 622. Demultiplexer 620 routes the trigger signal to the bit in the trigger status register such as the trigger status register 510 in FIG. 5 that corresponds to the thread specified in the interrupt thread identification value 632. Multiplexer 610 may be a multiplexer such as multiplexers 354 in FIG. 3 and may be one of multiplexers 520 in FIG. 5. Demultiplexer 620 may be a demultiplexer such as demultiplexers 356 in FIG. 3 and may be one of demultiplexers 544 in FIG. 5. Additional fields in counter registers 630 or in another control register may gate the freeze and trigger signals, and may enable or disable an interrupt generation on a trigger condition.

Figure 7:
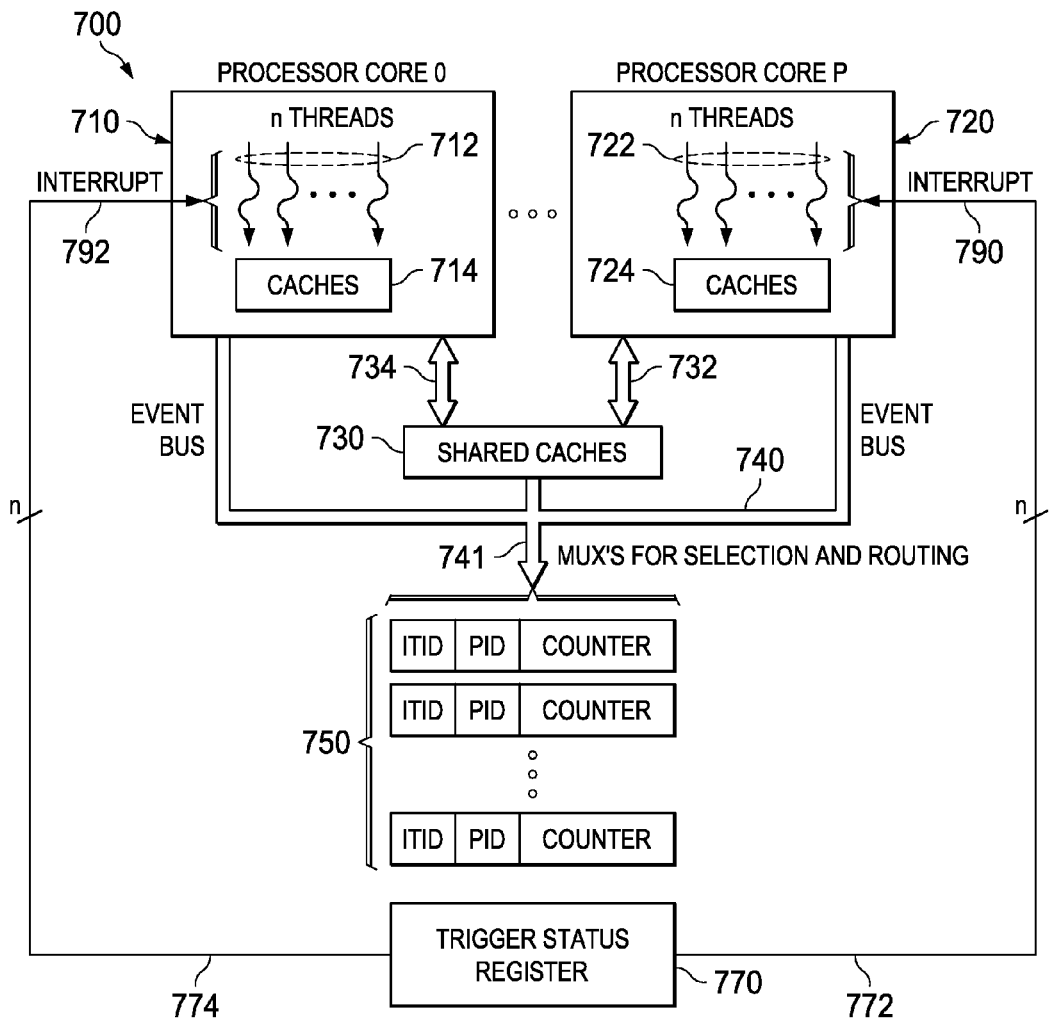
FIG. 7 is an illustration of multiple processor cores in accordance with an illustrative embodiment.

Turning to FIG. 7, an illustration of shared counters among multiple processor cores is disclosed in accordance with an illustrative embodiment. First processor core 710 and second processor core 720 are operably coupled by first bus 740 to a number of counters 750. Shared caches 730 are operably coupled to the number of counters 750 by first bus 740. Second bus 734 operably couples first processor core 710 to shared caches 730. Third bus 732 operably couples second processor core 720 to shared caches 730. First bus 740, second bus 734, and third bus 732 may be buses such as buses 340 in FIG. 3. First processor core 710 may have a number of threads running and caches 714. Second processor core 720 may have a number of threads 722 running and caches 724. One of the performance counters 750 may set a bit in trigger status register 770 upon an occurrence of a trigger condition. The bit in trigger status register 770 may interrupt one or more threads of threads 712 in first processor core 710 via first interrupt signal 792 via first interrupt channel 774 and one or more threads in threads 722 in second processor core 720 via second interrupt signal 790 via second interrupt channel 772. The bit in the trigger status register 770 also freezes all counters in the set of counters 750 that have the same interrupt thread identification value and processor identification value as the counter that set the trigger status bit upon occurrence of the trigger condition. Software such as program instructions 382 in FIG. 3 or program instructions that are part of the operating system 360 or the hypervisor 370 may clear the bit in trigger status register 770 after recording a corresponding sample instruction address or dealing with the trigger condition in other appropriate ways. To speed-up interrupt handling, a field may be provided in a separate register or in the trigger status register to indicate which counter had the trigger condition that caused the interrupt. In response to the bit in trigger status register 770 being cleared, corresponding counters that were frozen may be unfrozen. The illustrative embodiment shown in FIG. 7 can be applied to groups of cores. For example, there may be multiple groups of "p" cores each.

Figure 8:
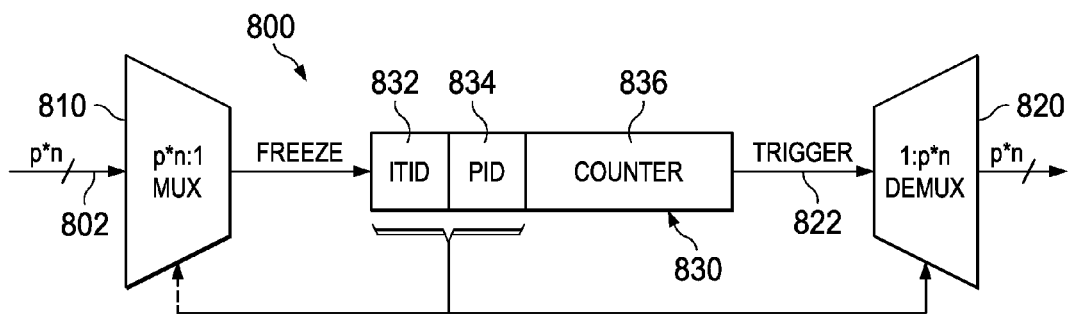
FIG. 8 is a frozen counter having an interrupt thread identification and a processor identification in accordance with an illustrative embodiment.

Turning to FIG. 8, a frozen counter having an interrupt thread identification and a processor identification is disclosed in accordance with an illustrative embodiment. Signal 802 from an interrupt channel such as interrupt channel 774 in FIG. 7 passes through multiplexer 810 to freeze counter 830 if the bit in the trigger status register that is selected by the multiplexer is set. The selection of a particular signal from signals 802 that is sent to the freeze signal of the counter is determined by the interrupt thread identification value 832 and processor identification value 834 of the counter. Counter 830 receives an interrupt thread identification value 832 and processor identification value 834 from system software, such as program instructions 382 in storage 380 or program instructions that are part of operating system 360 or hypervisor 370. Counter value 836 increments in response to the event signals received on an event bus such as bus 740 in FIG. 7. In response to counter 830 determining that a trigger condition has been met, counter 830 signals the trigger condition on channel 822. Demultiplexer 820 routes the trigger signal to the bit in the trigger status register such as the trigger status register 770 in FIG. 7 that corresponds to the thread specified in the interrupt thread identification value 832 and processor identification value 834. Multiplexer 810 may be a multiplexer such as multiplexers 354 in FIG. 3. Demultiplexer 820 may be a demultiplexer such as demultiplexers 356 in FIG. 3. Additional fields in the counter registers 830 or another control register may gate the freeze and trigger signals, and may enable or disable an interrupt generation on a trigger condition.

Figure 9:
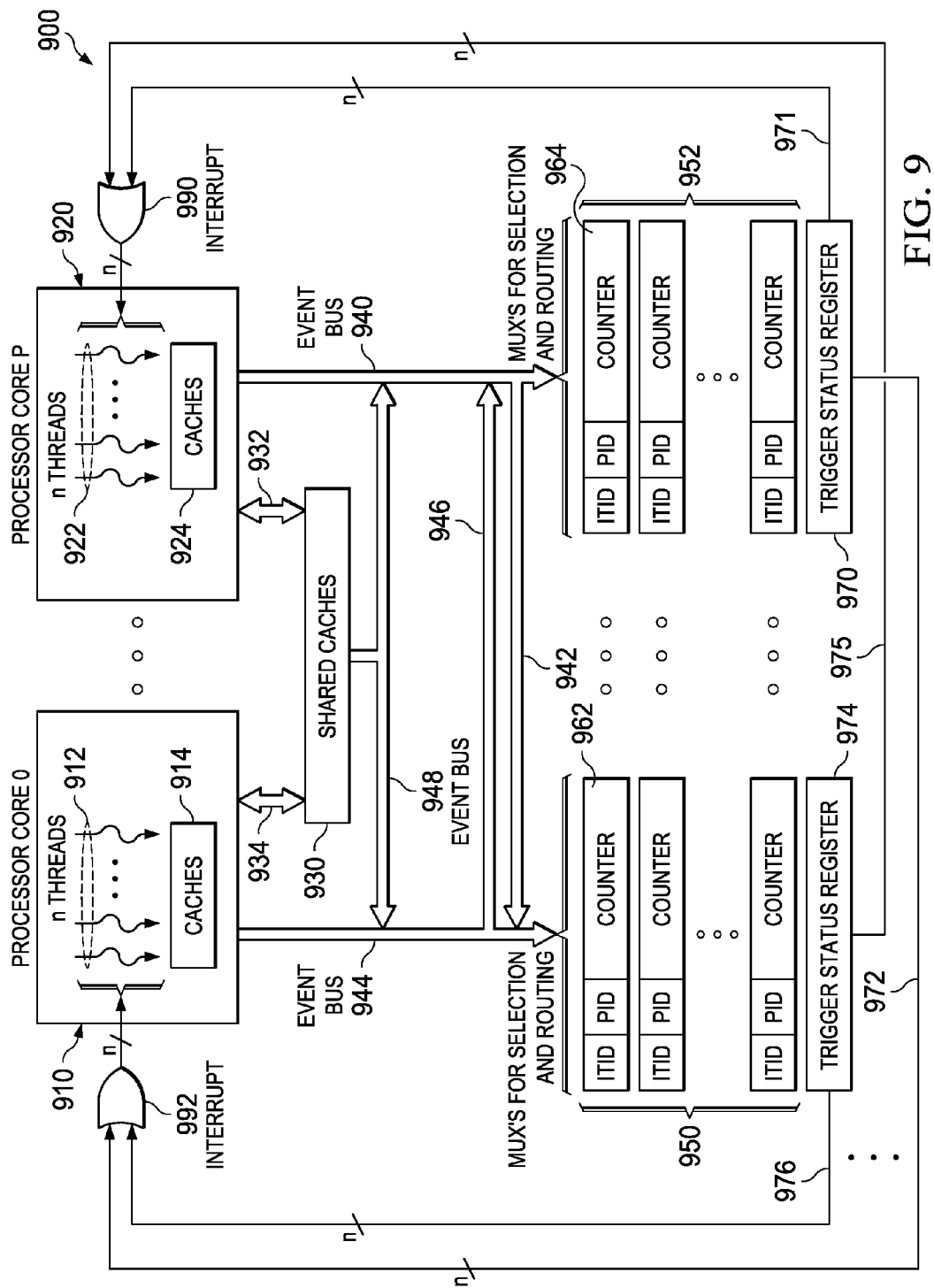
FIG. 9 is an illustration of multiple processor cores with multiple counters and multiple trigger status registers in accordance with an illustrative embodiment.

Turning to FIG. 9, an illustration of multiple processor cores with multiple counters and multiple trigger status registers is disclosed in accordance with an illustrative embodiment. The counters are counter registers such as counter registers 800 in FIG. 8. First processor core 910 is operably coupled to first counters 950 by first bus 944. Second processor core 920 is operably coupled to second counters 952 by second bus 940. Third bus 946 operably couples first bus 944 to second bus 940. Fourth bus 942 operably couples second bus 940 to first bus 944. Third bus 946 and fourth bus 942 permit sharing of counters in first counters 950 and second counters 952. Fifth bus 934 operably couples first processor core 910 to shared caches 930. Sixth bus 932 connects second processor core 920 to shared caches 930. Seventh bus 948 operably couples shared caches 930 to first bus 944 and to second bus 940. First bus 944, second bus 940, third bus 946, fourth bus 942, fifth bus 934, sixth bus 932 and seventh bus 948 may be buses such as buses 340 in FIG. 3.

First processor core 910 may have a number of threads 912 running and caches 914. Second processor core 920 may have a number of threads 922 running and caches 924. First performance counter 962 may set a bit in first trigger status register 974 upon an occurrence of a trigger condition. Second performance counter 964 may set a bit in second trigger status register 970. The bit in first trigger status register 974 interrupts one or more threads of threads 912 in first processor core 910 via first interrupt signal 992 via first interrupt channel 976 and one or more threads in threads 922 in second processor core 920 via second interrupt signal 990 via second interrupt channel 975.

The bit in second trigger status register 970 interrupts one or more threads of threads 912 in first processor core 910 via first interrupt signal 992 via third interrupt channel 972 and one or more threads in threads 922 in second processor core 920 via second interrupt signal 990 via fourth interrupt channel 971. The bit in the trigger status register 974 and 970 also freezes all counters in the set of counters 950 and 952 that have the same interrupt thread identification value and processor identification value as the counter that set the trigger status bit upon occurrence of the trigger condition. Software such as program instructions 382 in FIG. 3 or program instructions that are part of operating system 360 or hypervisor 370 may clear the bit in first trigger status register 974 and in second trigger status register 970 after recording a corresponding sample instruction address or dealing with the trigger condition in other appropriate ways. To speed-up interrupt handling, a field may be provided in a separate register or in the trigger status register to indicate which counter had the trigger condition that caused the interrupt. In response to the bits in first trigger status register 974 and in second trigger status register 970 being cleared, the corresponding counters that were frozen may be unfrozen. The illustrative embodiment shown in FIG. 9 can be applied to groups of cores. For example, there may be multiple groups of "p" cores each.

In an alternate embodiment, a mechanism may be provided to route an interrupt to an arbitrary thread so that a requirement to handle the interrupt at the processor thread on which the application thread is running is eliminated. Moreover, assigning counters dynamically to processor threads by system software avoids having to restore counter values in response to a software thread migrating to a different processor. An event for the new processor may be routed to the same counters as before the migration. For example, in response to a migration of a thread having an assigned counter from a first processor to a second processor creating a new thread, an event for the new thread may be routed to the assigned counter.

Figure 10:
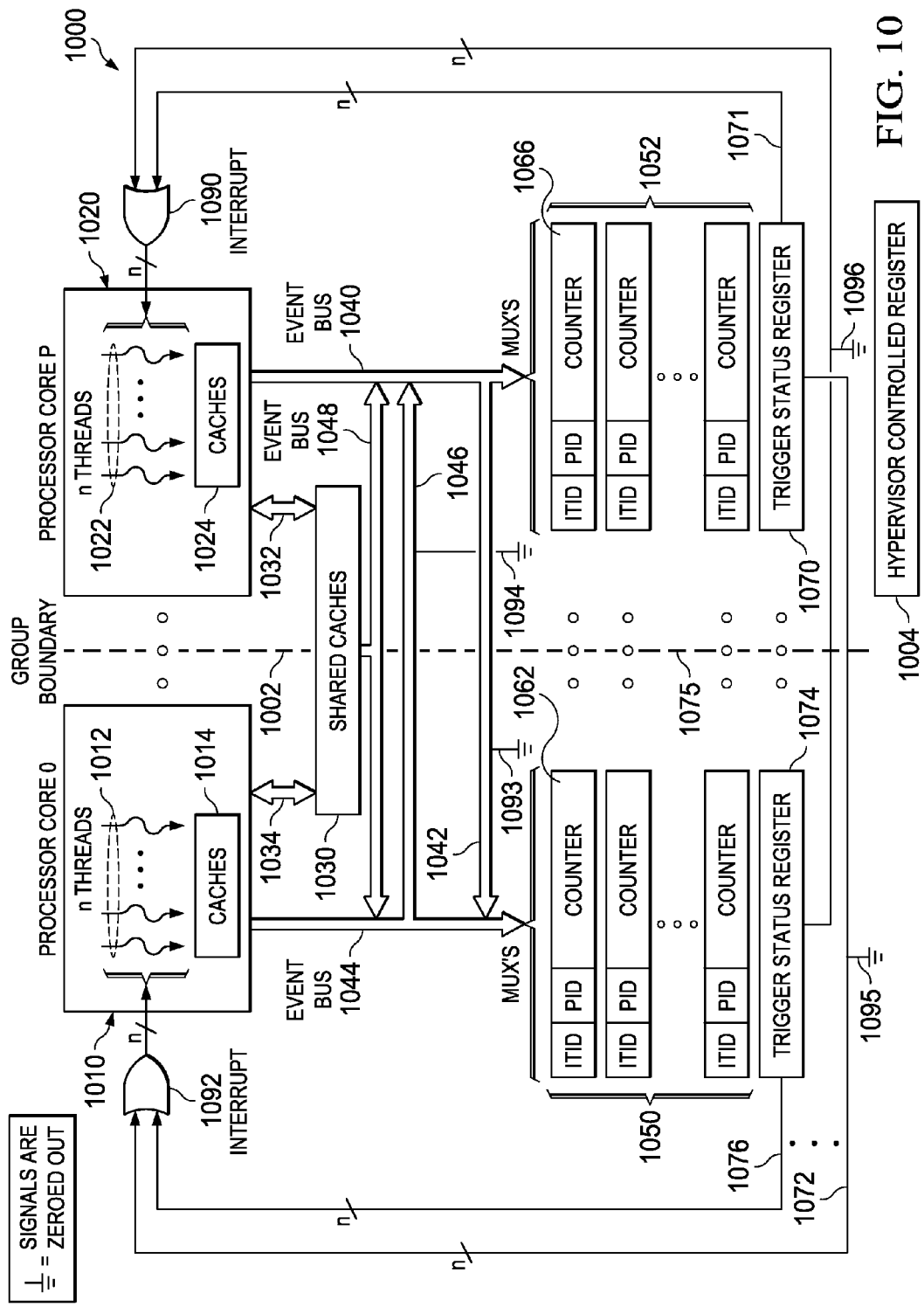
FIG. 10 is an illustration of multiple processor cores with multiple counters and multiple trigger status registers separated by a boundary in accordance with an illustrative embodiment.

Turning to FIG. 10, an illustration of multiple processor cores with multiple counters and multiple trigger status registers separated by a boundary is disclosed in accordance with an illustrative embodiment. The counters are counter registers such as counter registers 800 in FIG. 8. In processing system 1000, boundary 1002 is established by a hypervisor controlled register such as hypervisor register 326 in FIG. 3 as will be explained further below.

First processor core 1010 is operably coupled to first counters 1050 by first bus 1044. Second processor core 1020 is operably coupled to second counters 1052 by second bus 1040. Third bus 1046 operably couples first bus 1044 to second bus 1040. Fourth bus 1042 operably couples second bus 1040 to first bus 1044. Third bus 1046 and fourth bus 1042 permit sharing of counters in first counters 1050 and second counters 1052. Fifth bus 1034 operably couples first processor core 1010 to shared caches 1030. Sixth bus 1032 operably couples second processor core 1020 to shared caches 1030. Seventh bus 1048 operably couples shared caches 1030 to first bus 1044 and to second bus 1040. First bus 1044, second bus 1040, third bus 1046, fourth bus 1042, fifth bus 1034, sixth bus 1032 and seventh bus 1048 may be buses such as buses 340 in FIG. 3.

First processor core 1010 may have a number of threads 1012 running and caches 1014. Second processor core 1020 may have a number of threads 1022 running and caches 1024.

First performance counter 1062 may set a bit in first trigger status register 1074 upon an occurrence of a trigger condition. Second performance counter 1066 may set a bit in second trigger status register 1070. The bit in first trigger status register 1074 interrupts one or more threads of threads 1012 in first processor core 1010 via first interrupt signal 1092 via first interrupt channel 1076 but is prevented from interrupting one or more threads in threads 1022 in second processor core 1020 via second interrupt signal 1090 via second interrupt channel 1075 by boundary 1002.

The bit in second trigger status register 1070 interrupts one or more threads in threads 1022 in second processor core 1020 via second interrupt signal 1090 via fourth interrupt channel 1071 but is prevented from interrupting one or more threads of threads 1012 in first processor core 1010 via first interrupt signal 1092 via third interrupt channel 1072 by boundary 1002. If event signals from shared caches 1030 are attributable to a thread, those signals may also be zeroed out by boundary 1002 (not shown in figure). The bit in the trigger status register 1074 and 1070 may also freeze all counters in the set of counters 1050 and 1052 that have the same interrupt thread identification value and processor identification value as the counter that set the trigger status bit upon occurrence of the trigger condition. Software such as program instructions 382 in FIG. 3 or program instructions that are part of operating system 360 or hypervisor 370 may clear the bit in first trigger status register 1074 and in second trigger status register 1070 after recording a corresponding sample instruction address or dealing with the trigger condition in other appropriate ways. To speed-up interrupt handling, a field may be provided in a separate register or in the trigger status register to indicate which counter had the trigger condition that caused the interrupt. In response to the bits in first trigger status register 1074 and in second trigger status register 1070 being cleared, the corresponding counters that were frozen may be unfrozen. The illustrative embodiment shown in FIG. 10 can be applied to groups of cores. For example, there may be multiple groups of "p" cores each.

The illustrative embodiments recognize and take into account that one way in which boundary 1002 may control shared counters such as shared counters 1050 and 1052 may be by zeroing out signal points such as first zero point 1093 on fourth bus 1042, second zero point 1094 on third bus 1046, fourth zero point 1095 on third interrupt channel 1072 and fifth zero point 1096 on second interrupt channel 1075.

Figure 11:
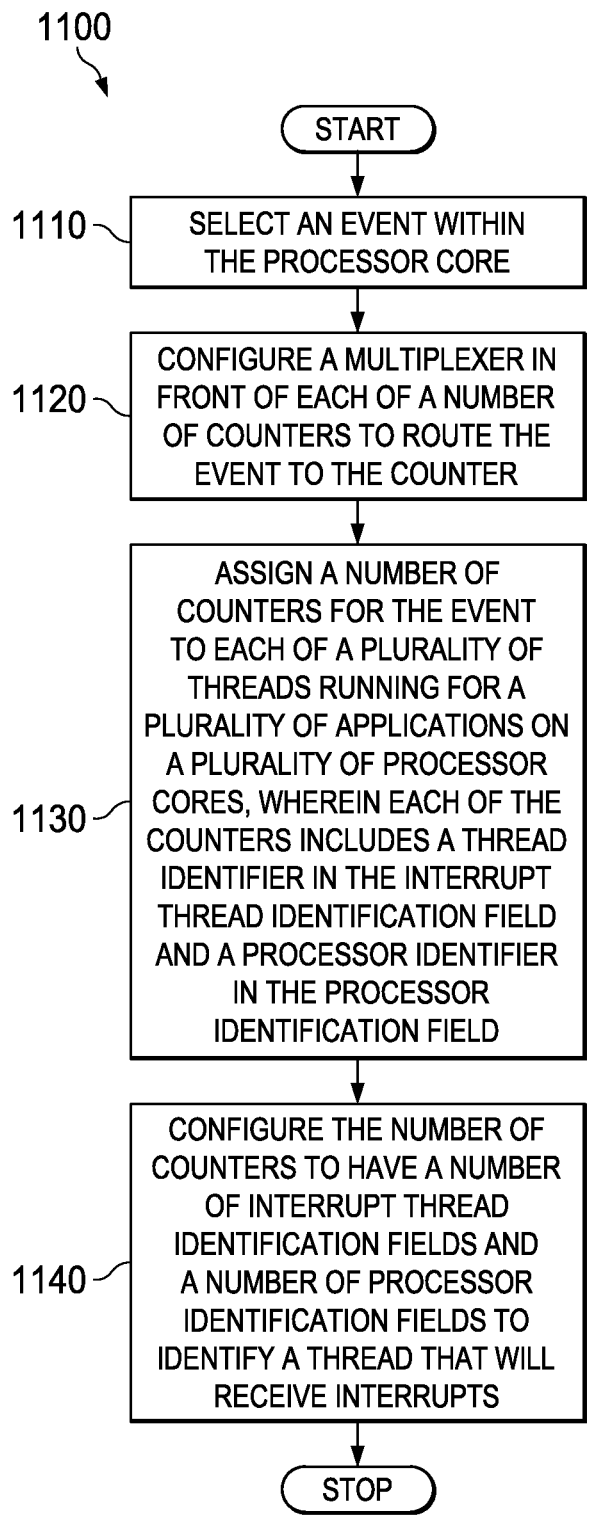
FIG. 11 is a flowchart of a process for sharing counters on a plurality of processor cores in accordance with an illustrative embodiment.

Turning to FIG. 11, a flowchart of a process for sharing counters on a plurality of processor cores is depicted in accordance with an illustrative embodiment. Process 1100 starts and selects an event within the processor core (step 1110). The event may be a performance event. Process 1100 configures a multiplexer in front of each of a number of counters to route the event to the counter (step 1120). Process 1100 assigns a number of counters for the event to each of a plurality of threads running for a plurality of applications on a plurality of processor cores, wherein each of the counters includes a thread identifier in the interrupt thread identification field and a processor identifier in the processor identification field (step 1130). Process 1100 configures the number of counters to have a number of interrupt thread identification fields and a number of processor identification fields to identify a thread that will receive interrupts (step 1140). Thus, the interrupt thread identification field and the processor identification field may be used to identify a thread that will receive interrupts and not necessarily a thread for which events are being counted. Process 1100 stops.

Figure 12:
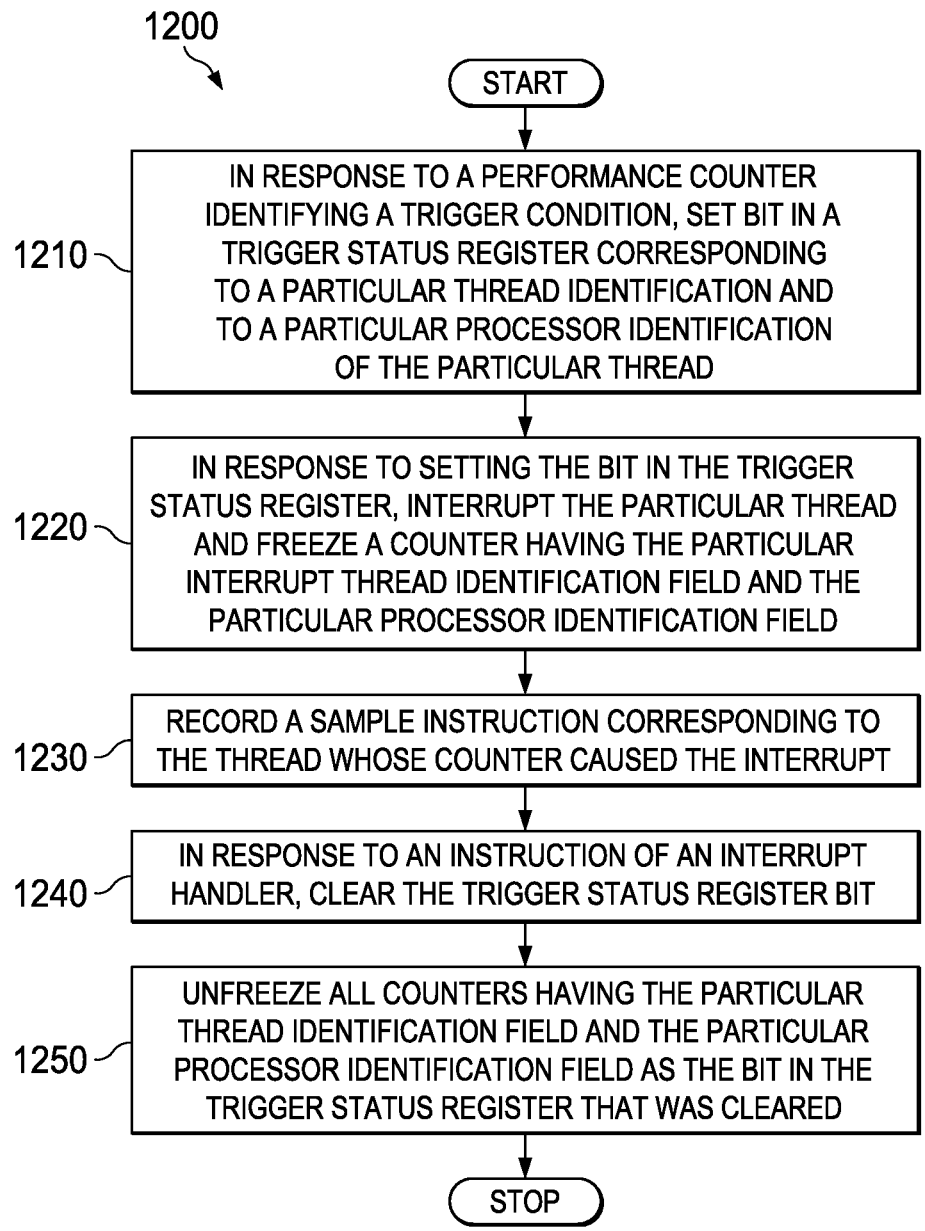
FIG. 12 is a flowchart of a process for freezing a counter in accordance with an illustrative embodiment.

Turning to FIG. 12, a flowchart of a process for freezing a counter is depicted in accordance with an illustrative embodiment. Process 1200 starts and, in response to a performance counter identifying a trigger condition, sets a bit in a trigger status register corresponding to a particular interrupt thread identification and to a particular processor identification of the particular thread (step 1210). In response to setting the bit in the trigger status register, process 1200 interrupts the particular thread and freezes a counter having the particular interrupt thread identification field and the particular processor identification field (step 1220). Process 1200 records a sample instruction corresponding to the thread whose counter caused the interrupt (step 1230). In an embodiment, the instruction sample may be recorded in a special register that is tracking instruction addresses that are running on a thread. In response to an instruction of an interrupt handler, process 1200 clears the trigger status register bit (step 1240). Process 1200 unfreezes all counters having the particular interrupt thread identification field and the particular processor identification field as the bit in the trigger status register that was cleared (step 1250) and stops.

Figure 13:
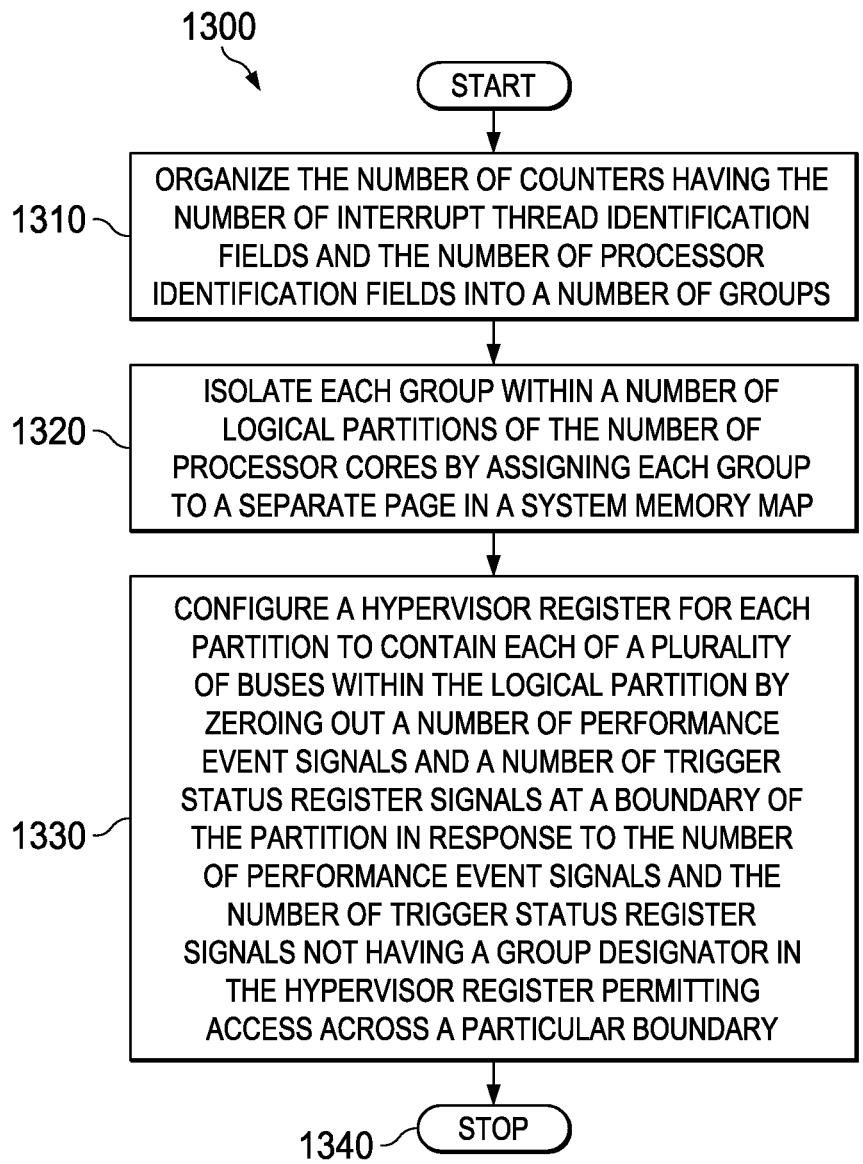
FIG. 13 is a flowchart of a process for isolating a number of counters by a hypervisor register in accordance with an illustrative embodiment.

Turning to FIG. 13, a flowchart of a process for isolating a number of counters by a hypervisor register is depicted in accordance with an illustrative embodiment. Process 1300 starts and organizes the number of counters having the number of interrupt thread identification fields and the number of processor identification fields into a number of groups (step 1310). Process 1300 isolates each group within a number of logical partitions of the number of processor cores by assigning each group to a separate page in a system memory map (step 1320). Process 1300 configures a hypervisor register for each partition to contain each of a plurality of buses within the logical partition by zeroing out a number of performance event signals and a number of trigger status register signals at a boundary of the partition in response to the number of performance event signals and the number of trigger status register signals not having a group designator in the hypervisor register permitting access across a particular boundary (step 1330) and stops (step 1340).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein; for example, in baseband or as part of a carrier wave. Such a propagated signal may take any of a variety of forms including, but not limited to, electro-magnetic, optical or any suitable combination thereof. A computer readable signal medium may be any computer readable medium that is not a computer readable storage medium and that can communicate, propagate or transport a program for use by or in connection with an instruction execution system, apparatus or device. Program code embodied in a computer readable signal medium may be transmitted using any appropriate medium including, but not limited to, wireless, wire line, optical fiber cable, RF, etc., or any suitable combination of the foregoing.

Computer program code for carrying out operations of the present invention may be written in any combination of one or more programming languages, including an object oriented programming language such as Java™, Smalltalk, C++ or the like, and conventional procedural programming languages, such as the "C" programming language or similar programming languages. (Java and all Java-based trademarks and logos are trademarks of Sun Microsystems, Inc., in the United States, other countries or both.) The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus, systems and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks. The computer program instructions may also be loaded onto a computer or other programmable data processing apparatus to cause a series of operational steps to be performed in the computer or other programmable apparatus to produce a computer-implemented process, such that the instructions that execute in the computer or other programmable apparatus provide processes for implementing the functions/acts specified in the flowchart and/or block diagram block or blocks. Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," as used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Aspects of the present invention have been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   selecting an event within a processor core;
   configuring a multiplexer in front of each of a number of counters to route the event to the counter;
   assigning a number of counters for the event to each of a plurality of threads running for a plurality of applications on a plurality of processor cores, wherein each of the counters comprises a thread identifier in the interrupt thread identification field and a processor identifier in the processor identification field;
   configuring the number of counters to have a number of interrupt thread identification fields and a number of processor identification fields to identify a thread that will receive a number of interrupts;
   setting a bit in a trigger status register corresponding to a particular interrupt thread identification and to a particular processor identification of a particular counter in response to the performance counter identifying a trigger condition; and
   freezing all counters having the same particular interrupt thread identification field and the same particular processor identification field as the bit in the trigger status register, while leaving other counters unaffected in response to being enabled to freeze all counters.

2. The method of claim 1 further comprising:
   sending an interrupt to interrupt the particular thread and freezing a counter having the particular interrupt thread identification field and the particular processor identification field in response to setting the bit in the trigger status register.

3. The method of claim 2 further comprising:
   processing the interrupt; and
   recording a sample instruction corresponding to the thread whose counter caused the trigger condition.

4. The method of claim 3 further comprising:
   clearing the trigger status register in response to an instruction of an interrupt handler; and
   unfreezing all counters having the particular interrupt thread identification field and the particular processor identification field as the bit in the trigger status register that was cleared, while leaving other counters unaffected.

5. The method of claim 2 further comprising:
   routing the interrupt to an arbitrary thread.

6. The method of claim 1 further comprising:
   routing an event for a new thread to the assigned counter in response to a migration of a thread having an assigned counter from a first processor to a second processor creating the new thread.

7. The method of claim 1 further comprising:
   organizing the number of counter registers having the number of interrupt thread identification fields and the number of processor identification fields into a number of groups;
   isolating each group within a number of logical partitions of the number of processor cores by assigning each group to a separate page in a system memory map.

8. The method of claim 7 further comprising:
   configuring a hypervisor register field for each partition to contain each of a plurality of buses within the logical partition by zeroing out a number of counter register signals and a number of trigger status register signals at a boundary of the partition in response to the number of counter register signals and the number of trigger status register signals not having a group designator in the hypervisor register permitting access across a particular boundary.

9. A system comprising:
   a plurality of processor cores operably coupled by a number of interrupt channels and buses to a plurality of counters and to a trigger status register;
   a processor operably coupled to a computer readable memory and to a computer readable storage medium;
   a plurality of instructions embodied in the computer readable storage medium configured to execute, via the computer readable memory, on the processor to perform actions comprising:
     selecting an event within a processor core;
     configuring a multiplexer in front of each of a number of counters to route the event to the counter;
     assigning a number of counters for the event to each of a plurality of threads running for a plurality of applications on the plurality of processor cores, wherein each of the counters includes a thread identifier in the interrupt thread identification field and a processor identifier in the processor identification field; and
     configuring the number of counters to have a number of interrupt thread identification fields and a number of processor identification fields to identify a thread that will receive a number of interrupts;
     configuring a hypervisor register field for each partition to contain each of a plurality of buses within the logical partition by zeroing out a number of counter register signals and a number of trigger status register signals at a boundary of the partition in response to the number of counter register signals and the number of trigger status register signals not having a group designator in the hypervisor register permitting access across a particular boundary.

10. The system of claim 9, wherein the plurality of instructions further comprise:
    organizing the number of counter registers having the number of interrupt thread identification fields and the number of processor identification fields into a number of groups; and
    isolating each group within a number of logical partitions of the number of processor cores by assigning each group to a separate page in a system memory map.

11. The system of claim 9 further comprising:
    wherein in response to a counter in a processor core identifying a trigger condition requiring an interruption of a particular thread on the particular processor core, the counter sets a bit in a trigger status register corresponding to a particular thread identification and to a particular processor identification of the particular thread;

wherein, in response to the counter setting the bit in the trigger status register, an interrupt signal interrupts the particular thread; and wherein, in response to the interrupt signal interrupting the particular thread, a first signal on an interrupt channel freezes a counter register having the particular thread identification field and the particular processor identification field.

12. The system of claim 9 further comprising:
wherein a mechanism in the chip routes a counter trigger condition interrupt to an arbitrary thread.

13. The system of claim 9 further comprising:
wherein, in response to a migration of a thread having an assigned counter from a first processor to a second processor creating a new thread, an event for the new thread is routed to the assigned counter.

14. The system of claim 9 further comprising:
a plurality of counter registers;
a plurality of buses operably coupling each of the plurality of processor cores to one or more of a plurality of computer readable memories, wherein the plurality of buses are operatively coupled with the core and extend outside of the core operably coupling the processor core to the plurality of computer readable memories;
a plurality of counter registers operably coupled to a plurality of triggers status registers; and
a plurality of interrupt channels operably coupling the plurality of trigger status registers to the plurality of processor cores.

15. The system of claim 9 further comprising:
a circuit in the chip that organizes the number of counter registers having the number of thread identification fields and the number of processor identification fields into a number of groups;
wherein the circuit in the chip isolates each group within a number of logical partitions of the number of processor cores by assigning each group to a separate page in a system memory map and using the page attributes to provide isolation by identifying the logical partitions that can access each group; and
wherein the circuit assigns a number of access rights to the number of registers by an individual or by an operating system or by a hypervisor.

16. A computer program product comprising:
a non-transitory computer readable storage medium having computer readable program code embodied therewith, the computer readable program code comprising:
computer program code configured to select an event within a processor core;
computer program code configured to configure a multiplexer in front of each of a number of counters to route the event to the counter;
computer program code configured to assign a number of counters for the event to each of a plurality of threads running for a plurality of applications on a plurality of processor cores, wherein each of the counters includes a thread identifier in the interrupt thread identification field and a processor identifier in the processor identification field;
computer program code configured to configure the number of counters to have a number of interrupt thread identification fields and a number of processor identification fields to identify a thread that will receive a number of interrupts; and
computer program code configured to configure a hypervisor register field for each partition to contain each of a plurality of buses within the logical partition by zeroing out a number of counter register signals and a number of trigger status register signals at a boundary of the partition in response to the number of counter register signals and the number of trigger status register signals not having a group designator in the hypervisor register permitting access across a particular boundary.

17. The computer program product of claim 16 further comprising:
computer program code configured to organize the number of counter registers having the number of interrupt thread identification fields and the number of processor identification fields into a number of groups; and
computer program code configured to isolate each group within a number of logical partitions of the number of processor cores by assigning each group to a separate page in a system memory map.

18. A method comprising:
selecting an event within a processor core;
configuring a multiplexer in front of each of a number of counters to route the event to the counter;
assigning a number of counters for the event to each of a plurality of threads running for a plurality of applications on a plurality of processor cores, wherein each of the counters comprises a thread identifier in the interrupt thread identification field and a processor identifier in the processor identification field;
configuring the number of counters to have a number of interrupt thread identification fields and a number of processor identification fields to identify a thread that will receive a number of interrupts;
organizing the number of counter registers having the number of interrupt thread identification fields and the number of processor identification fields into a number of groups;
isolating each group within a number of logical partitions of the number of processor cores by assigning each group to a separate page in a system memory map; and
configuring a hypervisor register field for each partition to contain each of a plurality of buses within the logical partition by zeroing out a number of counter register signals and a number of trigger status register signals at a boundary of the partition in response to the number of counter register signals and the number of trigger status register signals not having a group designator in the hypervisor register permitting access across a particular boundary.

19. A system comprising:
a plurality of processor cores operably coupled by a number of interrupt channels and buses to a plurality of counters and to a trigger status register;
a processor operably coupled to a computer readable memory and to a computer readable storage medium;
a plurality of instructions embodied in the computer readable storage medium configured to execute, via the computer readable memory, on the processor to perform actions comprising:
selecting an event within a processor core;
configuring a multiplexer in front of each of a number of counters to route the event to the counter;
assigning a number of counters for the event to each of a plurality of threads running for a plurality of applications on the plurality of processor cores, wherein each of the counters includes a thread identifier in the interrupt thread identification field and a processor identifier in the processor identification field; and configuring the number of counters to have a number of interrupt thread identification fields and a number of processor identification fields to identify a thread that will receive a number of interrupts;

wherein in response to a counter in a processor core identifying a trigger condition requiring an interruption of a particular thread on the particular processor core, the counter sets a bit in a trigger status register corresponding to a particular thread identification and to a particular processor identification of the particular thread;

wherein, in response to the counter setting the bit in the trigger status register, an interrupt signal interrupts the particular thread; and wherein, in response to the interrupt signal interrupting the particular thread, a first signal on an interrupt channel freezes a counter register having the particular thread identification field and the particular processor identification field.

\* \* \* \* \*